United States Patent
Stoehr et al.

(10) Patent No.: US 8,163,682 B2
(45) Date of Patent: Apr. 24, 2012

(54) OIL SOLUBLE POLYMERS

(75) Inventors: Torsten Stoehr, Frankfurt (DE); Michael Mueller, Bensheim (DE); Boris Eisenberg, Heppenheim (DE); Harald Becker, Bayreuth (DE); Axel Mueller, Wiesbaden (DE)

(73) Assignee: Evonik Rohmax Additives GmbH, Darmstadt (DE)

( * ) Notice: Subject to any disclaimer, the term of this patent is extended or adjusted under 35 U.S.C. 154(b) by 987 days.

(21) Appl. No.: 11/995,949

(22) PCT Filed: Aug. 4, 2006

(86) PCT No.: PCT/EP2006/065060
§ 371 (c)(1),
(2), (4) Date: Jan. 17, 2008

(87) PCT Pub. No.: WO2007/025837
PCT Pub. Date: Mar. 8, 2007

(65) Prior Publication Data
US 2010/0167970 A1 Jul. 1, 2010

(30) Foreign Application Priority Data
Aug. 31, 2005 (DE) .................. 10 2005 041 528

(51) Int. Cl.
C10M 145/14 (2006.01)
C08L 33/10 (2006.01)

(52) U.S. Cl. .................. 508/469; 508/470; 524/560

(58) Field of Classification Search .................. 508/469, 508/470; 524/560
See application file for complete search history.

(56) References Cited

U.S. PATENT DOCUMENTS

| | | | |
|---|---|---|---|
| 4,867,894 A * | 9/1989 | Pennewiss et al. ........... 508/470 |
| 5,955,405 A | 9/1999 | Liesen et al. |
| 6,369,162 B1 * | 4/2002 | Visger et al. .................. 525/260 |
| 2005/0148749 A1 | 7/2005 | Scherer et al. |
| 2005/0245406 A1 | 11/2005 | Scherer et al. |
| 2006/0189490 A1 | 8/2006 | Dardin et al. |
| 2007/0191238 A1 | 8/2007 | Fischer et al. |
| 2007/0197409 A1 | 8/2007 | Scherer et al. |
| 2007/0213237 A1 | 9/2007 | Scherer et al. |
| 2007/0219101 A1 | 9/2007 | Scherer et al. |
| 2009/0048406 A1 | 2/2009 | Iroff et al. |
| 2009/0182145 A1 | 7/2009 | Bohmke et al. |
| 2010/0167970 A1 | 7/2010 | Stoehr et al. |

FOREIGN PATENT DOCUMENTS

| | | |
|---|---|---|
| EP | 1 433 799 | 6/2004 |
| EP | 1433799 A2 * | 6/2004 |
| JP | 2000-510187 | 8/2000 |
| JP | 2003-515633 | 5/2003 |
| JP | 2003-516430 | 5/2003 |
| JP | 2006-509082 | 3/2006 |
| WO | 96 23012 | 8/1996 |
| WO | 00 24795 | 5/2000 |
| WO | WO 2004/087850 A1 | 10/2004 |
| WO | 2006 047398 | 5/2006 |

OTHER PUBLICATIONS

Sivaram, S., Lutz, P.J., Mishra, M., in Star and Hyperbranched Polymers, Mishra, M. and Kobayashi, S. eds., Marcel Dekker, 1999, p. 69. Retrieved from the internet at <http://books.google.com/books?id=a0Fpw2l00koC> on Dec. 27, 2010.*
U.S. Appl. No. 12/668,209, filed Jan. 8, 2010, Stoehr, et al.
U.S. Appl. No. 61/186,744, filed Jun. 12, 2009, Randano, et al.
U.S. Appl. No. 12/672,231, filed Feb. 4, 2010, Stoehr, et al.
U.S. Appl. No. 12/279,732, filed Aug. 18, 2008, Stoehr, et al.
Office Action issued Mar. 16, 2011 in Japan Application No. 2008-504672 (English Translation).
S. Sivaram et al., Branched Polymers via Group Transfer Polymerization), Star and Hyperbranched Polymers, edited by Munmaya K. Mishra, Marcel Dekker, Inc., pp. 59-77.
U.S. Appl. No. 13/213,547, filed Aug. 19, 2011, Mueller, et al.
U.S. Appl. No. 13/318,492, filed Nov. 2, 2011, Radano, et al.
U.S. Appl. No. 61/421,867, filed Dec. 10, 2010, Radano, et al.
U.S. Appl. No. 61/408,274, filed Oct. 29, 2010, Neveu, et al.
U.S. Appl. No. 61/421,870, filed Dec. 10, 2010, Radano.
U.S. Appl. No. 61/393,076, filed Oct. 14, 2010, Langston, et al.
U.S. Appl. No. 61/527,800, filed Aug. 26, 2011, McElwain, et al.
U.S. Appl. No. 61/421,876, filed Dec. 10, 2010, Radano.
U.S. Appl. No. 13/202,744, filed Aug. 22, 2011, Eisenberg, et al.
U.S. Appl. No. 13/255,218, filed Sep. 7, 2011, Eisenberg, et al.

* cited by examiner

Primary Examiner — Jim Goloboy
(74) Attorney, Agent, or Firm — Oblon, Spivak, McClelland, Maier & Neustadt, L.L.P.

(57) ABSTRACT (EN) The invention relates to a polymer comprising 50-100% by weight, with regard to the weight of the polymers, of repeating units, which are derived from one or more ethylenically unsaturated ester compounds of formula (I), in which R represents hydrogen or methyl; $R^1$ represents a linear or unbranched alkyl radical with 7 to 30 carbon atoms, and; $R^2$ and $R^3$ independently represent hydrogen or a group of formula —COOR', wherein R' represents hydrogen or an alkyl group with 7 to 30 carbon atoms. The polymer is a star polymer with 3 to 21 arms and at least 3 of the arms consist of at least 40% by weight, with regard to the weight of the arms, of repeating units, which are derived from one or more ethylenically unsaturated ester compounds of formula (I), in which $R^1$ represents a linear or unbranched alkyl radical with 7 to 30 carbon atoms, and; $R^2$ and $R^3$ independently represent hydrogen or a group of formula —COOR', wherein R' represents hydrogen or an alkyl group with 7 to 30 carbon atoms. The invention also relates to oil formulations comprising the inventive polymers. The inventive polymers having a high thickening action can be used, in particular, as viscosity modifiers, pour point depressants, dispersing agents and/or friction modifiers.

31 Claims, No Drawings

OIL SOLUBLE POLYMERS

The present application relates to oil-soluble polymers, to processes for their preparation and to their use.

Polyalkyl (meth)acrylates (PA(M)As)—generally synthesized by conventional free-radical copolymerization of a mixture of different alkyl (meth)acrylates (A(M)As)—bring about, as oil additives, depending on the molecular weight and composition, a rise in the viscosity index (VI) coupled with outstanding low-temperature properties compared to other viscosity index improvers (VIIs) (R. M. Mortier, S. T. Orszulik eds., Chemistry and Technology of Lubricants, Blackie Academic & Professional, 1st ed., London 1993, 124-159 & 165-167). A basic prerequisite for employability as oil additives is, trivially, the oil solubility of the polymers which, in the case of the PA(M)As, is based on the presence of a sufficiently large number of alkyl side chains having typically 7-30 carbon atoms.

The VI of PA(M)As can be raised further frequently by copolymerizing short-chain alkyl (meth)acrylates, for example methyl (meth)acrylate or butyl (meth)acrylate (EP 0 637 332, the Lubrizol Corporation). The VIs achievable with such PA(M)As are, depending on the concentration, permanent shear stability index (PSSI) and base oil type, usually in the range between 150 and 250.

Additional functionality with regard to the dispersing action of soot and soil particles is achieved by the copolymerization of nitrogen- and/or oxygen-containing monomers, such as dimethylaminoethyl (meth)acrylate (U.S. Pat. No. 2,737,496, E.I. du Pont de Nemours and Company) or dimethylaminopropyl (meth)acrylamide (U.S. Pat. No. 4,021,357 Texaco Inc.).

The viscosities of polymer solutions in mineral oils or synthetic oils are dependent on the molecular weight to a high degree. This also has the consequence that the temperature dependence of the viscosity decreases or that of the VI increases with rising molecular weight (J. Bartz, Additive für Schmierstoffe, [Additives for Lubricants], Expert-Verlag, Renningen-Malmsheim 1994, 197-252). In connection with the temperature increase, reference is also made to disentanglement of the collapsed tangle to give the extended wormlike molecule.

In parallel with the molecular weight, the shear stability, however, decreases as a result of chain fracture under high shear. As a consequence of this opposing effect, shear-stable VIIs, as required for manual transmission oils, automatic transmission oils, hydraulic oils or motor oils, based on conventional polymer types such as the PA(M)As, are realizable only with high added amounts. VIIs with a low viscosity contribution at low temperatures, normally thickening in the VI range from 40 to 100° C., high viscosity contribution above 100° C. and simultaneously guaranteed good oil solubility in the entire temperature range are thus of particular interest.

A further class of commercial VIIs is that of hydrogenated styrene-diene copolymers. A particular embodiment of these copolymers is a star polymer composed of hydrogenated polyisoprene arms and a divinylbenzene-crosslinked polystyrene core (U.S. Pat. No. 4,116,917 Shell Oil Company). It has been found that star-shaped polymers have an advantageous effect on the relations of the mutually dependent parameters of thickening action, VI and shear stability (SAE Technical Paper Series, 982638, 14-30).

There are a wide variety of different approaches to prepare star polymers based on PA(M)As. For instance, the mercaptan utilized for molecular weight control of a conventional free-radical polymerization can be used, for example, in the form of a pentaerythritol derivative which has four thiol functionalities. In the examples of WO 00/29495 (Ineos Acrylics UK Ltd), the synthesis of poly(isobutyl methacrylate) stars by just this process is detailed. In the case of such star polymers, the arms, however, are bonded via thioether bridges which are known to be exceptionally oxidation-unstable and therefore cannot find use in applications, for example, as an oil additive. The conventional free-radical polymerization utilized here also does not allow the preparation of star polymers with block structures.

Most approaches to the preparation of PAMA star polymers utilize "controlled polymerizations". Controlled polymerization processes feature the possibility of adjusting the desired molecular weight precisely with narrow molecular weight distribution and allow, by changing the monomer source during the polymerization, the preparation of block copolymers.

One approach consists in the synthesis via GTP (group transfer polymerization), a process for controlled polymerization. For instance, the examples of U.S. Pat. No. 4,794,144 (E.I. du Pont de Nemours and Company) describe the synthesis of star polymers based on poly(methyl methacrylate) and poly(2-ethylhexyl methacrylate). In this context, both synthetic routes in which the arms are synthesized first proceeding from monofunctional silyl ketene acetals and then crosslinked with difunctional monomers in situ (arm first) and synthetic routes with the reverse sequence (core first) are utilized equally. In both cases, a star composed of a crosslinked core with an undefined number of arms forms.

Anionic polymerization is also a process for controlled polymerization and can be utilized to prepare stars. In this case—similarly to that for GTP—the arms are first polymerized at the start proceeding from monofunctional lithium organyls (arm first) and then the arms are crosslinked with difunctional monomers to give a core. For instance, WO 96/23012 (Texaco Development Corporation) teaches the synthesis of C1-C18-PA(M)A stars, whereas EP 0 936 225 (Ethyl Corporation) uses a continuous process to prepare exactly these C1-C18-PA(M)A stars. Here too, an undefined number of arms forms. In both applications, the PA(M)A stars find use as additives for lubricant oil formulations.

Since the middle to the end of the 1990s, the methods of controlled free-radical polymerization such as ATRP (atom transfer radical polymerization), base application WO 96/30421 Carnegie-Mellon University), RAFT (reversible addition fragmentation chain transfer polymerization), base application WO 98/01478, E.I. du Pont de Nemours and Company) or NMP (nitroxide mediated polymerization), base application U.S. Pat. No. 4,581,429, Commonwealth Scientific and Industrial Research Organization) have been known. An excellent overview of these methods is given by: K. Matyjaszewski, T. P. Davis, Handbook of Radical Polymerization, Wiley Interscience, Hoboken 2002. Such methods of controlled free-radical methodology allow, via core first synthetic routes, the production of star polymers with a defined number of arms, since—in contrast to GTP or anionic techniques—it is possible here to prepare polyfunctional initiators by simple synthetic routes, which—unlike GTP and anionic techniques—do not have to be polymerized in an anhydrous system. The detour via synthetic cores composed of crosslinked difunctional monomers is unnecessary.

ATRP in particular allows, after initiation by readily available polyfunctional alkyl halides, star polymers based on vinylic monomers with a defined number of arms in the range from 3 to 21 to be obtained. For such ATRP synthesis, tris (bromomethyl)mesitylene, tetrakis (bromomethyl)benzene, hexakis(bromomethyl)benzene, phenol derivatives, cyclotetrasiloxane derivatives, cyclophosphazene derivatives, calixarene derivatives and cyclodextrin derivatives have already been described as suitable initiators (K. Matyjaszewski, T. P. Davis, *Handbook of Radical Polymerization*, Wiley Interscience, Hoboken 2002, 820-825).

ATRP stars via sugar-based initiators, for example based on glucose and sucrose, have also already been described (M. H. Stenzel-Rosenbaum, T. P. Davis, V. Chen, A. Fane, *Macromolecules* 34 (2001), 5433).

In addition, EP 1 244 716 (RohMax Additives GmbH) describes ATRP processes for preparing narrow-distribution PA(M)A, which has optionally been copolymerized with nitrogen- or oxygen-functional monomers, in the presence of mineral oil for use as a lubricant oil additive.

WO 01/40339 (RohMax Additives GmbH) claims, in a controlled manner, block copolymers via ATRP consisting of PA(M)As and, for example, nitrogen- or oxygen-functional monomers for use as a lubricant oil additive. More specifically, WO 04/087850 (RohMax Additives GmbH) describes lubricant oil formulations of outstanding frictional properties, which include, for example, PA(M)A block copolymers which have been prepared by ATRP and have nitrogen- or oxygen-functional comonomers as friction modifiers.

In particular, WO 03/095512 (Ciba Specialty Chemical Holdings) teaches copolymers via ATRP consisting, inter alia, of PA(M)A and nitrogen- or oxygen-functional monomers, and the terminal antioxidant, metal deactivator, antiwear, extreme pressure or corrosion inhibitor functionality for use as a lubricant oil additive.

Finally, it should be noted that, in an entirely different field of polymeric additives, cosmetic formulations based on water and oil, which comprise ATRP star polymers based on PA(M)A, are protected in EP 1 043 343 to 1 043 347 (L'Oréal).

The polymers detailed above are in many cases used commercially. Accordingly, most of these polymers have a satisfactory property profile. However, there is a permanent effort to improve the relations of thickening action, shear stability and VI in order to achieve, with minimum use of additive in lubricant oils—with avoidance of premature shear degradation of the polymers—a desired viscosity over a wide temperature range.

Furthermore, the polymers should be preparable in a simple and inexpensive manner, while, in particular, commercially available components should be used. At the same time, it should be possible to effect production on the industrial scale without needing new plants or plants of complicated construction for this purpose.

These objects and further objects which are not stated explicitly but which are immediately derivable or discernible from the connections discussed herein by way of introduction are achieved by polymers having all features of claim 1. Appropriate modifications of the inventive polymers are protected in the subclaims referring back to claim 1. With regard to the process for preparing polymers, claim 20 provides a solution to the problem of interest, while claim 23 protects an oil formulation comprising the polymers of the present invention.

By virtue of a star polymer having from 3 to 21 arms and at least three of the arms comprising at least 40% by weight, based on the weight of the arms, of units which are derived from one or more ethylenically unsaturated ester compounds of the formula (I)

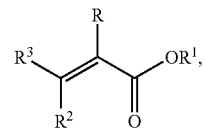

in which R is hydrogen or methyl, R¹ is a linear or branched alkyl radical having from 7 to 30 carbon atoms, R² and R³ are each independently hydrogen or a group of the formula —COOR' in which R' is hydrogen or an alkyl group having from 7 to 30 carbon atoms, it is possible in a not immediately foreseeable manner to provide polymers comprising 50-100% by weight, based on the weight of the polymer, of repeat units which are derived from one or more ethylenically unsaturated ester compounds of the formula (I)

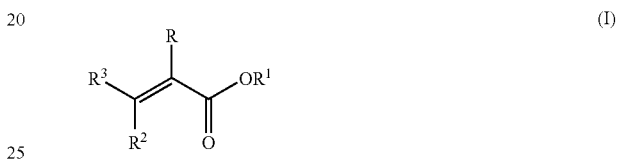

in which R is hydrogen or methyl, R¹ is a linear or branched alkyl radical having from 7 to 30 carbon atoms, R² and R³ are each independently hydrogen or a group of the formula —COOR' in which R' is hydrogen or an alkyl group having from 7 to 30 carbon atoms, which have a high thickening action with a low shear sensitivity.

At the same time, the inventive polymers can achieve a series of further advantages. These include:
- the polymers of the present invention may have outstanding action for improving the low-temperature properties, for example the pour point and the Brookfield viscosities at −26° C. or −40° C.
- Polymers, in a particular aspect of the present invention, may have excellent action as friction improvers.
- Moreover, preferred polymers exhibit outstanding dispersing action.
- Furthermore, the inventive polymers have outstanding filterability.
- The viscosity index of the present polymers can be adjusted over a very wide range as required. For instance, in one aspect, the inventive polymers may have a surprisingly high viscosity index, whereas preferred polymers, in a further aspect, exhibit a particularly low viscosity index.
- Preferred polymers of the present invention have outstanding oxidation stability.
- The polymers of the present invention can be prepared particularly easily and simply. At the same time, it is possible to use customary industrial scale plants.

The inventive polymers are star polymers. The term "star polymers" used herein is known per se, these polymers having a center, from which three and more chains emerge, which are referred to hereinafter as arms. The center may be an individual atom or an atom group.

The inventive star polymers have from 3 to 21, preferably from 5 to 15 and more preferably from 7 to 12 arms. The polymer chains or arms proceed from a center which may be an atom group. The atom group forming the center preferably has at most 100 carbon atoms, more preferably at most 50 carbon atoms and most preferably at most 25 carbon atoms.

The number of the arms and the number of carbon atoms of the center arise preferably from the initiator used, the number of arms depending on the number of centers that the initiator has, and the number of carbon atoms depending on the type and structure of the initiator. The type of initiator depends on the polymerization process.

At least 3, preferably at least 5 and most preferably at least 8 of the arms of the inventive star polymer comprise at least 40% by weight, preferably at least 50% by weight and most preferably at least 80% by weight, based on the weight of the arms, of units which are derived from one or more ethylenically unsaturated ester compounds of the formula (I)

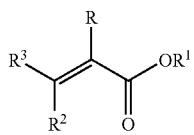

in which R is hydrogen or methyl, $R^1$ is a linear or branched alkyl radical having from 7 to 30 carbon atoms, $R^2$ and $R^3$ are each independently hydrogen or a group of the formula —COOR' in which R' is hydrogen or an alkyl group having from 7 to 30 carbon atoms.

The term "repeat unit" is widely known in the technical field. The present star polymers can be obtained proceeding from polyfunctional core first initiators preferably via "controlled polymerization", which includes the controlled free radical ATRP, RAFT and NMP processes, anionic and cationic polymerization and GTP, without any intention that this should impose a restriction. In these processes, double bonds are opened to form covalent bonds. Accordingly, the repeat unit arises from the monomers used.

The present invention describes polymers which preferably have a high oil solubility. The term "oil-soluble" means that it is possible to prepare a mixture of a base oil and an inventive polymer without microscopic phase formation, which comprises at least 0.1% by weight, preferably at least 0.5% by weight, of the inventive polymers. The polymer may be present dispersed and/or dissolved in this mixture. The oil solubility depends especially on the proportions of the lipophilic and lipophobic monomers and on the base oil. This property is known to those skilled in the art and can be adjusted easily for the particular base oil via the proportion of lipophilic and lipophobic monomers.

The term "lipophilic monomer" denotes ethylenically unsaturated compounds whose homopolymers having a molecular weight of 100 000 g/mol have an oil solubility of at least 0.1% by weight, preferably at least 0.5% by weight and most preferably at least 1% by weight at 0° C. in a paraffin-base mineral oil.

The term "lipophobic monomer" denotes ethylenically unsaturated compounds whose homopolymers having a molecular weight of 100 000 g/mol have an oil solubility of at most 0.1% by weight, preferably at most 0.05% by weight and most preferably at most 0.01% by weight at 0° C. in a paraffin-base mineral oil.

The inventive polymers comprise 50-100% by weight, preferably from 55 to 95% by weight, based on the weight of the polymer, of repeat units which are derived from one or more ethylenically unsaturated ester compounds of the formula (I)

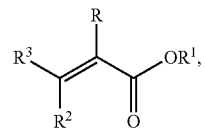

in which R is hydrogen or methyl, $R^1$ is a linear or branched alkyl radical having from 7 to 30 carbon atoms, $R^2$ and $R^3$ are each independently hydrogen or a group of the formula —COOR' in which R' is hydrogen or an alkyl group having from 7 to 30 carbon atoms.

The ethylenically unsaturated ester compounds of the formula (I) include
(meth)acrylates, fumarates and maleates which derive from saturated alcohols, such as 2-ethylhexyl (meth)acrylate, heptyl (meth)acrylate, 2-tert-butylheptyl (meth)acrylate, octyl (meth)acrylate, 3-isopropylheptyl (meth)acrylate, nonyl (meth)acrylate, decyl (meth)acrylate, undecyl (meth)acrylate, 5-methylundecyl (meth)acrylate, dodecyl (meth)acrylate, 2-methyldodecyl (meth)acrylate, tridecyl (meth)acrylate, 5-methyltridecyl (meth)acrylate, tetradecyl (meth)acrylate, pentadecyl (meth)acrylate, hexadecyl (meth)acrylate, 2-methyl-hexadecyl (meth)acrylate, heptadecyl (meth)acrylate, 5-isopropylheptadecyl (meth)acrylate, 4-tert-butyloctadecyl (meth)acrylate, 5-ethyloctadecyl (meth)acrylate, 3-isopropyloctadecyl (meth)acrylate, octadecyl (meth)acrylate, nonadecyl (meth)acrylate, eicosyl (meth)acrylate, cetyleicosyl (meth)acrylate, stearyleicosyl (meth)acrylate, docosyl (meth)acrylate and/or eicosyltetratriacontyl (meth)acrylate; cycloalkyl (meth)acrylates, such as 2,4,5-tri-t-butyl-3-vinylcyclohexyl (meth)acrylate, 2,3,4,5-tetra-t-butylcyclohexyl (meth)acrylate; (meth)acrylates which derive from unsaturated alcohols, for example oleyl (meth)acrylate; cycloalkyl (meth)acrylates such as 3-vinylcyclohexyl (meth)acrylate, bornyl (meth)acrylate; and the corresponding fumarates and maleates.

The expression "(meth)acrylates" encompasses methacrylates and acrylates and also mixtures of the two. These monomers are widely known. The alkyl radical therein may be linear, cyclic or branched.

The ester compounds with long-chain alcohol radicals can be obtained, for example, by reacting short-chain (meth)acrylates, fumarates, maleates and/or the corresponding acids with long-chain fatty alcohols, which generally forms a mixture of esters, for example (meth)acrylates with different long-chain alcohol radicals.

These fatty alcohols include Oxo Alcohol® 7911 and Oxo Alcohol® 7900, Oxo Alcohol® 1100; Alfol® 610, Alfol® 810, Lial® 125 and Nafol® types (Sasol Olefins & Surfactant GmbH); Alphanol® 79 (ICI); Epal® 610 and Epal® 810 (Ethyl Corporation); Linevol®79, Linevol® 911 and Neodol® 25E (Shell AG); Dehydad®, Hydrenol® and Lorol® types (Cognis); Acropol® 35 and Exxal® 10 (Exxon Chemicals GmbH); Kalcol® 2465 (Kao Chemicals).

In a particular aspect of the present invention, preference is given to using mixtures of long-chain alkyl (meth)acrylates of the formula (I). The proportion of the (meth)acrylates having from 6 to 15 carbon atoms in the alcohol radical is preferably in the range from 20 to 95% by weight, based on the weight of the monomer composition for preparing the star polymer. The proportion of the (meth)acrylates having from 16 to 30 carbon atoms in the alcohol radical is preferably in the range from 0.5 to 60% by weight based on the weight of the monomer composition for preparing the star polymers.

In addition, the polymer may have repeat units which are derived from further monomers.

These include especially (meth)acrylates, fumarates and maleates having a $C_1$-$C_6$ alkyl radical.

For example, the polymer may comprise from 0.1 to 40% by weight, preferably from 0.5 to 30% by weight and more preferably from 1 to 20% by weight of repeat units which are derived from one or more ethylenically unsaturated ester compounds of the formula (II)

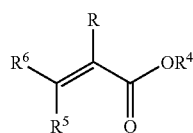

(II)

in which R is hydrogen or methyl, $R^4$ is a linear or branched alkyl radical having from 1 to 6 carbon atoms, $R^5$ and $R^6$ are each independently hydrogen or a group of the formula —COOR" in which R" is hydrogen or an alkyl group having from 1 to 6 carbon atoms.

Examples of ethylenically unsaturated ester compounds of the formula (II) include (meth)acrylates, fumarates and maleates which derive from saturated alcohols, such as methyl (meth)acrylate, ethyl (meth)acrylate, n-propyl (meth)acrylate, isopropyl (meth)acrylate, n-butyl (meth)acrylate, tert-butyl (meth)acrylate, pentyl (meth)acrylate and hexyl (meth)acrylate; cycloalkyl (meth)acrylates such as cyclopentyl (meth)acrylate; (meth)acrylates which derive from unsaturated alcohols, such as 2-propynyl (meth)acrylate, allyl (meth)acrylate and vinyl (meth)acrylate.

Among the ethylenically unsaturated ester compounds, particular preference is given to the (meth)acrylates over the maleates and fumarates, i.e. $R^2$, $R^3$, $R^5$ and $R^6$ of the formulae (I) and (II) in particularly preferred embodiments are hydrogen. In general, the methacrylates are preferred over the acrylates.

Optionally, the inventive polymer may comprise up to 30% by weight, preferably up to 20% by weight, more preferably up to 10% by weight, of repeat units which are derived from dispersing oxygen- and/or nitrogen-functionalized monomers (III).

In a particular aspect, the dispersing oxygen- and/or nitrogen-functionalized monomer may be a dispersing (meth) acrylate or (meth)acrylamide which has been prepared from an alcohol $R^7$—OH or amine $R^7$—$NR^8$—H where $R^7$ is independently a group which comprises from 2 to 200 carbon atoms, especially from 2 to 20 carbon atoms, more especially from 2 to 10 carbon atoms and has at least one heteroatom, and in which $R^8$ are independently hydrogen or a group having from 1 to 20 carbon atoms.

$R^7$ comprises heteroatom-containing aromatic groups and heteroatom-containing aliphatic alkyl and cycloalkyl groups, and also alkoxy, cycloalkoxy, alkanoyl, alkoxycarbonyl groups.

According to the invention, aromatic groups denote radicals of mono- or polycyclic aromatic compounds having preferably from 6 to 20, in particular from 6 to 12, carbon atoms. Preferred aromatic groups derive from benzene, naphthalene, biphenyl, diphenyl ether, diphenylmethane, diphenyldimethylmethane, bisphenone, furan, pyrrole, oxazole, imidazole, isoxazole, pyrazole, 1,3,4-oxadiazole, 2,5-diphenyl-1,3,4-oxadiazole, 1,3,4-triazole, 2,5-diphenyl-1,3,4-triazole, 1,2,5-triphenyl-1,3,4-triazole, 1,2,4-oxadiazole, 1,2,4-triazole, 1,2,3-triazole, 1,2,3,4-tetrazole, benzo[b]furan, indole, benzo[c]furan, isoindole, benzoxazole, benzimidazole, benzisoxazole, benzopyrazole, benzotriazole, dibenzo-furan, carbazole, pyridine, bipyridine, pyrazine, pyrazole, pyrimidine, pyridazine, 1,3,5-triazine, 1,2,4-triazine, 1,2,4,5-triazine, tetrazine, quinoline, isoquinoline, quinoxaline, quinazoline, cinnoline, 1,8-naphthyridine, 1,5-naphthyridine, 1,6-naphthyridine, 1,7-naphthyridine, phthalazine, pyridopyrimidine, purine, pteridine or quinolizine, 4H-quinolizine, diphenyl ether, anthracene, benzo-pyrrole, benzooxadiazole, benzopyridine, benzopyrazine, benzopyrazidine, benzopyrimidine, benzotriazine, indolizine, pyridopyridine, imidazopyrimidine, pyrazinopyrimidine, carbazole, aciridine, phenazine, benzoquinoline, phenoxazine, acridizine, benzopteridine, phenanthroline and phenanthrene.

The preferred alkyl groups include the methyl, ethyl, propyl, isopropyl, 1-butyl, 2-butyl, 2-methylpropyl, tert-butyl radical, pentyl, 2-methylbutyl, 1,1-dimethylpropyl, hexyl, heptyl, octyl, 1,1,3,3-tetramethylbutyl, nonyl, 1-decyl, 2-decyl, undecyl, dodecyl, pentadecyl and the eicosyl group.

The preferred cycloalkyl groups include the cyclopropyl, cyclobutyl, cyclopentyl, cyclohexyl, cycloheptyl and the cyclooctyl group.

The preferred alkoxy groups include alkoxy groups whose hydrocarbon radical is one of the aforementioned preferred alkyl groups.

The preferred cycloalkoxy groups include cycloalkoxy groups whose hydrocarbon radical is one of the aforementioned preferred cycloalkyl groups.

The preferred alkanoyl groups include the formyl, acetyl, propionyl, 2-methylpropionyl, butyryl, valeroyl, pivaloyl, hexanoyl, decanoyl and the dodecanoyl group.

The preferred alkoxycarbonyl groups include the methoxycarbonyl, ethoxycarbonyl, propoxycarbonyl, butoxycarbonyl, tert-butoxycarbonyl, hexyloxycarbonyl, 2-methylhexyloxycarbonyl, decyloxycarbonyl or dodecyloxycarbonyl group.

The $R^7$ groups mentioned may have further substituents, such as linear or branched alkyl groups having from 1 to 6 carbon atoms, for example methyl, ethyl, propyl, butyl, pentyl, 2-methylbutyl or hexyl; cycloalkyl groups, for example cyclopentyl and cyclohexyl; or else halides.

The preferred heteroatoms in the $R^7$ group include, as well as oxygen and nitrogen, also sulfur, boron, silicon and phosphorus. The heteroatom may preferably be present in the form of an alcohol, ether, ester, amino or amide group.

In a particular embodiment of the present invention, the $R^7$ radical comprises at least one group of the formula —$OR^8$ or —$NR^8R^8$, in which $R^8$ is independently hydrogen or a group having from 1 to 20 carbon atoms.

The numerical ratio of heteroatoms to carbon atoms in the $R^7$ radical may be within wide ranges. This ratio is preferably in the range from 1:1 to 1:10, especially from 1:1 to 1:5 and more preferably from 1:2 to 1:4.

The repeat units which are derived from dispersing oxygen- and/or nitrogen-functionalized monomers (III) include especially repeat units which are derived from aminoalkyl (meth)acrylates such as N,N-dimethylaminoethyl (meth) acrylate (DMAE(M)A), N,N-dimethylaminopropyl (meth) acrylate, N,N-diethylaminopentyl (meth)acrylate, N,N-dibutylaminohexadecyl (meth)acrylate.

This also includes especially repeat units which are derived from aminoalkyl(meth)acrylamides such as N,N-dimethylaminopropyl(meth)acrylamide (DMAP(M)AAm).

This also includes especially repeat units which are derived from hydroxyalkyl (meth)acrylates such as 3-hydroxypropyl (meth)acrylate, 3,4-dihydroxybutyl (meth)acrylate, 2-hydroxyethyl (meth)acrylate (HE(M)A), 2-hydroxypropyl (meth)acrylate, 2,5-dimethyl-1,6-hexanediol (meth)acrylate, 1,10-decanediol (meth)acrylate.

This also especially includes repeat units which are derived from heterocyclic (meth)acrylates, such as 2-(1-imidazolyl) ethyl (meth)acrylate, 2-(4-morpholinyl)ethyl (meth)acrylate, 1-(2-methacryloyloxyethyl)-2-pyrrolidone, N-methacryloylmorpholine, N-methacryloyl-2-pyrrolidinone, N-(2-methacryloyloxyethyl)-2-pyrrolidinone, N-(3-methacryloyloxypropyl)-2-pyrrolidinone.

These also include especially repeat units which are derived from nitriles of (meth)acrylic acid and other nitrogen-containing methacrylates, such as N-(methacryloyloxyethyl) diisobutyl ketimine, N-(methacryloyloxyethyl)dihexadecyl ketimine, methacryloylamidoacetonitrile, 2-methacryloyloxyethylmethylcyanamide, cyanomethyl methacrylate.

The repeat units which are derived from dispersing oxygen- and/or nitrogen-functionalized monomers (III) also include repeat units which are derived from heterocyclic vinyl compounds, such as 2-vinylpyridine, 4-vinylpyridine, 2-methyl-5-vinylpyridine, 3-ethyl-4-vinylpyridine, 2,3-dimethyl-5-vinylpyridine, vinylpyrimidine, vinylpiperidine, 9-vinylcarbazole, 3-vinylcarbazole, 4-vinylcarbazole, 1-vinyl imidazole, 2-methyl-1-vinylimidazole, N-vinylpyrrolidone, N-vinyl-pyrrolidine, 3-vinylpyrrolidine, N-vinylcaprolactam, N-vinylbutyrolactam, vinyloxolane, vinylfuran, vinyloxazoles and hydrogenated vinyloxazoles.

In addition, the polymer may have repeat units of further comonomers (IV) which do not belong to groups (I), (II) or (III), especially
of styrene monomers such as styrene; substituted styrenes having an alkyl substituent in the side chain, such as α-methylstyrene and α-ethylstyrene; substituted styrenes having an alkyl substituent on the ring, such as vinyltoluene and p-methylstyrene; halogenated styrenes, for example monochlorostyrene, dichlorostyrene, tribromo-styrene and tetrabromostyrene,
of vinyl esters such as vinyl acetate and vinyl propionate, or
of vinyl halides such as vinyl chloride, vinyl fluoride, vinylidene chloride and vinylidene fluoride.

All aforementioned ethylenically unsaturated monomers may be used individually or as mixtures. It is additionally possible to vary the monomer composition during the polymerization of the arms of the polymers in order to obtain defined structures, for example block copolymers or gradient copolymers.

The star polymer of the present invention preferably has a weight-average molecular weight $M_w$ in the range from 10 000 g/mol to 450 000 g/mol, more preferably from 25 000 g/mol to 150 000 g/mol and most preferably from 30 000 g/mol to 90 000 g/mol.

The inventive star polymers preferably have a narrow molecular weight distribution which is more preferably monomodal. Preference is given to a polydispersity $M_w/M_n$ in the range from 1.0 to 2, more preferably from 1.0 to 1.3.

The weight-average molecular weight $M_w$ and the number-average molecular weight $M_n$ can be determined by GPC, and the polydispersity $M_w/M_n$ is calculated as the quotient of these values. These are apparent values whose determination is common knowledge.

For example, the measurement can be effected in tetrahydrofuran at 35° C. against a polymethyl methacrylate calibration curve composed of a set of ≧25 standards (Polymer Standards Service or Polymer Laboratories) whose $M_{peak}$ is distributed in logarithmically uniform manner over the range from $5 \cdot 10^6$ to $2 \cdot 10^2$ g/mol. It is possible to use combinations of six columns (Polymer Standards Service SDV 100 Å/2× SDV LXL/2×SDV 100 Å/Shodex KF-800D).

Preferred polymers of the present invention exhibit outstanding filterability.

The polymers preferably have a filterability of at least 80%, more preferably at least 90% and most preferably at least 95%, based on a projected filterability under stage 1 of ISO 13357-2 (5 μm filter).

Preferred polymers may a filterability of at least 60%, more preferably at least 70% and most preferably at least 80%, based on the overall profile of the filtration under stage 2 of ISO 13357-2 (5 μm filter) on.

In a particular aspect of the present invention, the repeat units may be present in the form of blocks and segments.

The star polymer may preferably have at least two blocks in at least one arm, preferably in a plurality of arms and most preferably in all arms. Blocks have a constant composition composed of one or more monomer units.

The monomers of group (I) are the ethylenically unsaturated ester compounds of the formula (I). The monomers of group (II) are the ethylenically unsaturated ester compounds of the formula (II). The monomers of group (III) correspond to the dispersing oxygen- and/or nitrogen-functionalized monomers detailed above. The monomers of group (IV) correspond to the further comonomers detailed above.

Monomers of group (I) are preferably lipophilic. Monomers of groups (I), (II) and (III) are preferably lipophobic.

The star polymer preferably has at least one lipophilic block comprising a high proportion of repeat units derived from monomers of the formula (I), and at least one lipophobic block comprising a high proportion of repeat units derived from monomers of groups (II), (III) and/or (IV).

In a particular aspect, a block which is rich in lipophobic monomers of groups (II), (III) and/or (IV) may have at least 50% by weight, more preferably at least 70% by weight, based on the weight of the block, of repeat units which are derived from one or more ethylenically unsaturated monomers of groups (II), (III) and/or (IV).

When the above block having a high proportion of lipophobic repeat units which are derived from one or more monomers of group (II), (III) and/or (IV) is preferably arranged close to the center of the star polymer, this architecture brings about a viscosity index-increasing action. In this context, the expression "close to the center" means that the block is arranged preferably in the first half, more preferably in the first third, of the corresponding arm, the center constituting the start.

When the above block having a high proportion of lipophobic repeat units which are derived from one or more monomers of group (II), (III) and/or (IV) is preferably arranged close to the end of the arm of the star polymer, this architecture brings about a viscosity index-increasing action. In this context, the expression "close to the end of an arm" means that the block is arranged preferably in the second half, more preferably in the last third, of the corresponding arm, the center constituting the start.

Polymers which have a high proportion of dispersing monomers of group (III) at the end of at least one arm may in many cases have a surprisingly high action as friction improvers.

In a particular aspect, polymers may therefore have, close to the center, a block which comprises a high proportion of one or more ethylenically unsaturated ester compounds of the formula (II) and/or further comonomers of group (IV), and a block which is derived from dispersing monomers (III) close to the end of the arm.

The length of the purely lipophobic segments is at least 3, preferably at least 5 and more preferably at least 10 monomer units. The lipophobic segments preferably have a weight-average degree of polymerization in the range from 10 to 100.

The inventive polymers may be prepared in various ways.

For instance, these polymers may be prepared proceeding from a polyfunctional core first initiator especially by processes for controlled free-radical polymerization, for example ATRP, RAFT or NMP.

The ATRP process is known per se. It is assumed that this is a "living" free-radical polymerization without any intention that the description of the mechanism shall impose a restriction. In these processes, a transition metal compound is reacted with a compound which has a transferable atom group. The transferable atom group is transferred to the transition metal compound, which oxidizes the metal. This reaction forms a free radical which adds onto ethylenic groups. The transfer of the atom group to the transition metal compound is, however, reversible, such that the atom group is transferred back to the growing polymer chain, as a result of which a controlled polymerization system is formed. Accordingly, the structure of the polymer, the molecular weight and the molecular weight distribution can be controlled. Furthermore, patent applications WO 96/30421, WO 97/47661, WO 97/18247, WO 98/40415 and WO 99/10387 disclose variants of the ATRP illustrated above.

In addition, the inventive polymers can also be obtained, for example, via RAFT methods. This process is described in detail, for example, in WO 98/01478 and WO 2004/083169, to which reference is made explicitly for the purposes of the disclosure.

Moreover, the inventive polymers are obtainable by NMP processes, which are described, inter alia, in U.S. Pat. No. 4,581,429.

These methods are detailed comprehensively, especially with further references, inter alia, in K. Matyjaszewski, T. P. Davis, *Handbook of Radical Polymerization*, Wiley Interscience, Hoboken 2002, to which reference is made explicitly for the purposes of the disclosure.

The inventive star polymers may also be prepared proceeding from a polyfunctional core first initiator via other known "controlled" polymerization processes, such as via anionic polymerization, cationic polymerization or GTP. The latter processes are known per se and are described, for example, in G. Odian, *Principles of Polymerization*, John Wiley & Sons, 4th ed. New York 2004.

In order to obtain the inventive star polymers, preference is given here to using initiators which have from 3 to 21, more preferably from 5 to 15 and most preferably from 7 to 12 transferable groups. These initiators are in many cases known per se and are described in the literature detailed above.

These include tris(bromomethyl)mesitylene, tetrakis(bromomethyl)benzene, hexakis(bromo-methyl)benzene and phenol derivatives, cyclotetrasiloxane derivatives, cyclophosphazene derivatives, calixarene derivatives and cyclodextrin derivatives.

In addition, comprise suitable initiators which are based on sugar, for example based on glucose and sucrose. These also include the ATRP initiators penta(α-bromoisobutyryl)glucose and octa(α-bromo-isobutyryl)sucrose.

The controlled free-radical polymerization can be performed at standard pressure, reduced pressure or elevated pressure. The polymerization temperature is also uncritical. In general, it is, however, in the range from −20° to 200° C., preferably from 0° to 150° C. and more preferably from 50° to 120° C.

The controlled free-radical polymerization can be performed with or without solvent. The term "solvent" should be understood here in its broad sense. The solvent is selected according to the polarity of the monomers used, and preference may be given to using 100N oil, lighter gas oil and/or aromatic hydrocarbons, for example toluene or xylene.

The inventive star polymer may preferably be used in oil formulations, especially in lubricant oil formulations and cosmetic formulations.

A lubricant oil formulation preferably comprises base oils of API group I, II, III, IV and/or group V. A lubricant oil formulation comprises at least one lubricant oil.

The lubricant oils include especially mineral oils, synthetic oils and natural oils.

Mineral oils are known per se and commercially available. They are generally obtained from mineral oil or crude oil by distillation and/or refining and optionally further purification and finishing processes, the term mineral oil including in particular the higher-boiling fractions of crude or mineral oil. In general, the boiling point of mineral oil is higher than 200° C., preferably higher than 300° C., at 5000 Pa. The production by low-temperature carbonization of shale oil, coking of bituminous coal, distillation of brown coal with exclusion of air, and also hydrogenation of bituminous or brown coal is likewise possible. Mineral oils are also produced in a smaller proportion from raw materials of vegetable (for example from jojoba, rapeseed) or animal (for example neatsfoot oil) origin. Accordingly, mineral oils have, depending on their origin, different proportions of aromatic, cyclic, branched and linear hydrocarbons.

In general, a distinction is drawn between paraffin-base, naphthenic and aromatic fractions in crude oils or mineral oils, in which the term paraffin-base fraction represents longer-chain or highly branched isoalkanes, and naphthenic fraction represents cycloalkanes. In addition, mineral oils, depending on their origin and finishing, have different fractions of n-alkanes, isoalkanes having a low degree of branching, known as mono-methyl-branched paraffins, and compounds having heteroatoms, in particular O, N and/or S, to which a degree of polar properties are attributed. However, the assignment is difficult, since individual alkane molecules may have both long-chain branched groups and cycloalkane radicals, and aromatic parts. For the purposes of the present invention, the assignment can be effected to DIN 51 378, for example. Polar fractions can also be determined to ASTM D 2007.

The fraction of n-alkanes in preferred mineral oils is less than 3% by weight, the proportion of O-, N- and/or S-containing compounds less than 6% by weight. The proportion of the aromatics and of the mono-methyl-branched paraffins is generally in each case in the range from 0 to 40% by weight. In one interesting aspect, mineral oil comprises mainly naphthenic and paraffin-base alkanes which have generally more than 13, preferably more than 18 and most preferably more than 20 carbon atoms. The fraction of these compounds is generally ≧60% by weight, preferably ≧80% by weight, without any intention that this should impose a restriction. A preferred mineral oil contains from 0.5 to 30% by weight of aromatic fractions, from 15 to 40% by weight of naphthenic fractions, from 35 to 80% by weight of paraffin-base fractions, up to 3% by weight of n-alkanes and from 0.05 to 5% by weight of polar compounds, based in each case on the total weight of the mineral oil.

An analysis of particularly preferred mineral oils, which was effected by means of conventional processes such as urea separation and liquid chromatography on silica gel, shows, for example, the following constituents, the percentages relating to the total weight of the particular mineral oil used:

n-alkanes having from approx. 18 to 31 carbon atoms: 0.7-1.0%,
slightly branched alkanes having from 18 to 31 carbon atoms: 1.0-8.0%,
aromatics having from 14 to 32 carbon atoms: 0.4-10.7%,
iso- and cycloalkanes having from 20 to 32 carbon atoms: 60.7-82.4%,
polar compounds: 0.1-0.8%,
loss: 6.9-19.4%.

Valuable information with regard to the analysis of mineral oils and a list of mineral oils which have a different composition can be found, for example, in Ullmann's Encyclopedia of Industrial Chemistry, 5th Edition on CD-ROM, 1997, under "lubricants and related products".

Synthetic oils include organic esters, for example diesters and polyesters, polyalkylene glycols, polyethers, synthetic hydrocarbons, especially polyolefins, among which preference is given to polyalphaolefins (PAO), silicone oils and perfluoro-alkyl ethers. They are usually somewhat more expensive than the mineral oils, but have advantages with regard to their performance.

Natural oils are animal or vegetable oils, for example neatsfoot oils or jojoba oils.

These oils may also be used as mixtures and are in many cases commercially available.

The concentration of the star polymers in the oil formulation is preferably in the range from 0.1 to 40% by weight, more preferably in the range from 1 to 25% by weight, based on the total weight of the composition.

Preferred oil formulations have a viscosity measured to ASTM D 445 at 40° C. in the range from 10 to 120 mm$^2$/s, more preferably in the range from 22 to 100 mm$^2$/s.

The oil formulations of the present invention generally have a high shear stability, which can be reported especially as the permanent shear stability index (PSSI). The PSSI to ASTM D5621 (ultrasound for 40 min) is preferably at most 30, more preferably at most 25 and most preferably at most 20. The PSSI measured to DIN 51350, part 6 (20 h, tapered roller bearing) is preferably at most 70, more preferably at most 50 and most preferably at most 30.

In a particular aspect of the present invention, preferred oil formulations have a viscosity index which can be set in a controlled manner and is determined to ASTM D2270 in the range from 0 to 300. In a particular aspect of the present invention, the polymers may have a viscosity index of at least 150, preferably at least 200 and most preferably at least 250. In another aspect of the present invention, the polymers may have a viscosity index of at most 100, more preferably at most 50.

High viscosity indices imply that optionally present lipophobic repeat units are arranged close to the center of the star polymer. The lipophobic repeat units include especially methyl (meth)acrylate and ethyl (meth)acrylate.

For other applications, associating properties may be desirable, for example as a cosmetic additive, in order to enable gelation. Such polymers may therefore be used especially as gelling agents. In such associating polymers of low viscosity index, at least one block which comprises high proportions of lipophobic associating repeat units is present close to the end of an arm of the star polymer.

In addition to the aforementioned star polymers, an oil formulation, in the special case of the lubricant oil formulation, may comprise further additives.

These additives include antioxidants, corrosion inhibitors, antifoams, antiwear components, dyes, color stabilizers, detergents and/or DI additives.

In addition, these additional additives include viscosity index improvers, pour point improvers, dispersants and/or friction modifiers which may more preferably be based on a linear polyalkyl (meth)acrylate having from 1 to 30 carbon atoms in the alcohol group. These linear polyalkyl (meth) acrylates are described especially in the prior art discussed by way of introduction, and these polymers may comprise dispersing monomers.

The inventive star polymers are preferably used as viscosity modifiers, pour point improvers, dispersants and/or friction modifiers. According to the above description, viscosity modifiers shall be understood to mean both viscosity index improvers and gelling agents.

The invention will be illustrated in detail hereinafter with reference to examples, without any intention that this shall impose a restriction.

A) Preparation of the Polymers

1. Preparation of the Polyfunctional Initiators

The 5-arm initiator penta(α-bromoisobutyryl)glucose and the 8-arm initiator octa(α-bromoisobutyryl)sucrose were synthesized by a literature method (M. H. Stenzel-Rosenbaum, T. P. Davis, V. Chen, A. Fane, *Macromolecules* (2001), 5433) with 73% and 72% yield respectively. The structure was confirmed in each case by means of $^1$H NMR, which coincided with literature data (M. H. Stenzel-Rosenbaum et al.).

In addition, both initiators were characterized by means of MALDI-ToF-MS. To this end, the Bruker Daltonics Reflex 3 with 337 nm N$_2$ laser at acceleration voltage 20 kV was used. The samples were each mixed in a mass ratio of 2,5-dihydroxybenzoic acid/LiCl/initiator=10/1/1. 100 mol % with 5-fold functionalization (M+M$_{Li+}$=931 g/mol) were identified in the case of penta(α-bromoisobutyryl)glucose, and 87 mol % with 8-fold functionalization (M+M$_{Li+}$=1541 g/mol) and 13 mol % with 7-fold functionalization (M+M$_{Li+}$=1393 g/mol) in the case of octa(α-bromoisobutyryl)sucrose.

2. Preparation of the Inventive Star Polymers

An apparatus consisting of 2 l reaction flask with dropping funnel, saber stirrer, condenser, thermometer and N$_2$ feed line was utilized. First, 500 g of monomers according to table 1 were initially charged together with 500 g of i-octane in the reaction flask. Subsequently, 0.6 g of CuCl, 0.01 g of CuBr$_2$ and initiator (from 25 to 2.5 g of penta(α-bromoisobutyryl) glucose or octa(α-bromoiso-butyryl)sucrose according to the desired number of arms and desired molecular weight) were added. After inertizing by passing N$_2$ through and heating to 60° C., 1.1 g of pentamethylenediethylenetriamine were added in order to start the reaction, which gave a heterogeneous mixture since the complexed catalyst was present only incompletely dissolved. After a noticeable exotherm, the mixture was allowed to react at 60° C. for 6 h, then at 70° C. for 6 h, then at 80° C. for 6 h and at 90° C. for a further 40 h [in the case of the star (block) PAMA, the block comonomer was added dropwise at 90° C. within 5 min and allowed to react at 90° C. for a further 40 h]. The termination was effected by adding 5 ml of a solution of 10 g/l of CuBr$_2$, 10 g/l of pentamethylene-diethylenetriamine and 5 g/l of Irganox® 1010 in i-octane. The reaction solution was pressure-filtered while warm through an Al$_2$O$_3$ column to remove the copper salt. The product was digested repeatedly with 3 times the volume of methanol and the methanol was decanted off. Finally, the methanol was drawn off. A solvent-free 100% viscous to rubberlike polymer was obtained.

3. Preparation of Narrow-Distribution Linear Polymers

All narrow-distribution linear (block) PAMAs apart from comparative example 7 were prepared by ATRP. Comparative example 7 which comprises the copper-complexing monomer DMAPMAAm was prepared by RAFT.

3.1. Preparation of Comparative Examples 1 to 6

ATRP

An apparatus consisting of 2 l reaction flask with dropping funnel, saber stirrer, condenser, thermometer and $N_2$ feed line was utilized. First, 600 g of monomers according to table 1 [564 g of C12/13/14/15 MA in the case of the linear block PAMA, comparative example 6] were initially charged together with 400 g of 100N oil in the reaction flask and inertized by adding dry ice and passing $N_2$ over. Subsequently, the mixture was heated to 95° C. with stirring.

During the heating operation at about 70° C., 1.1 g of CuBr and 1.4 g of pentamethylenediethylenetriamine were added to obtain a heterogeneous mixture, since the complexed catalyst was present only incompletely dissolved. On attainment of the preset temperature of 95° C., ethyl bromoisobutyrate (from 7.5 g to 1.5 g according to the desired molecular weight) was added in order to start the reaction. The mixture was allowed to react at 95° C. for 6 h [in the case of comparative example 6, the mixture was allowed to react at 95° C. for 2 h, 36 g of DMAEMA were added dropwise within 5 min and the mixture was allowed to react at 95° C. for a further 4 h]. Subsequently, the mixture was pressure-filtered while warm to remove the copper salt (Seitz T1000 10 µm depth filter). A 60% viscous solution was obtained.

3.2. Preparation of Comparative Example 7

RAFT

Comparative example 7 was prepared by RAFT in a 2 l reaction flask of an apparatus with a dropping funnel, saber stirrer, condenser, thermometer and $N_2$ feed line. To this end, 540 g of C12/13/14/15 MA were initially charged together with 2.71 g of cumyl dithiobenzoate, 1.14 g of tert-butyl peroctoate and 400 g of 100N oil in the reaction flask, and inertized by adding dry ice and passing $N_2$ over. Subsequently, the mixture was heated to 85° C. After 5 h, 60 g of DMAPMAAm were added dropwise. After a further 2.5 h, 0.60 g of tert-butyl peroctoate was added and the reaction mixture was stirred at 85° C. overnight. A 60% reddish viscous solution was obtained.

4. Preparation of Conventional Linear Polymers

Comparative Examples 8 to 13

600 g of monomers according to table 1 and N-dodecyl mercaptan (from 20 g to 2 g according to the desired molecular weight) are mixed. 44.4 g of this monomer/regulator mixture are filled together with 400 g of 100N oil into the 2 l reaction flask of an apparatus with saber stirrer, condenser, thermometer, feed pump and $N_2$ feed line. The apparatus is inertized and heated to 100° C. with the aid of an oil bath. The remaining bulk of 555.6 g of monomer/regulator mixture is admixed with 1.4 g of tert-butyl peroctoate. When the mixture in the reaction flask has attained a temperature of 100° C., 0.25 g of tert-butyl peroctoate is added, and the feed of the monomer/regulator/initiator mixture by means of a pump is started at the same time. The addition is effected uniformly at 100° C. over a period of 210 min. 2 h after the end of feeding, another 1.2 g of tert-butyl peroctoate are added and the mixture is stirred at 100° C. for a further 2 h. A 60% clear solution is obtained.

B. Determination of the Molecular Weights

The mass-average molecular weights $M_w$ and the polydispersity index PDI of the polymers were determined by GPC (table 1). The measurements were effected in tetrahydrofuran at 35° C. against a polymethyl methacrylate calibration curve composed of a set of $\geq 25$ standards (Polymer Standards Service or Polymer Laboratories), whose $M_{peak}$ was distributed in a logarithmically uniform manner over the range from $5 \cdot 10^6$ to $2 \cdot 10^2$ g/mol. A combination of 6 columns (Polymer Standards Service SDV 100 Å/2×SDV LXL/2×SDV 100 Å/Shodex KF-800D) was used. To record the signal, an RI detector (Agilent 1100 Series) was used.

Owing to a star structure-related altered relationship of hydrodynamic volume and molecular weight $M_w$, the molecular weights $M_w$ of the star (block) PAMAs are only apparent values. Typically, the values measured for star polymers are somewhat higher than those of the conventional or narrow-distribution linear PAMAs of similar PSSI.

All molecular weight distributions of the star polymers prepared by ATRP were strictly monomodal with no indications whatsoever of free-radical star-star couplings which, if present, would be noticeable at about double the number-average $M_n$, or of crosslinking which would be recognizable by extra peaks toward higher molecular weights.

TABLE 1

Polymers used

| | Composition | $M_w$ [g/mol] | PDI |
|---|---|---|---|
| Example 1 | (C12/13/14/15MA)$_8$ | 29 390 | 1.2 |
| Example 2 | (C12/14MA)$_8$ | 35 700 | 1.1 |
| Example 3 | (C12/14MA)$_5$ | 89 800 | 1.2 |
| Example 4 | (C12/14MA)$_8$ | 117 100 | 1.1 |
| Example 5 | (C12/14MA)$_5$ | 407 200 | 1.9 |
| Example 6 | (C12/14MA-block-DMAEMA 94-6)$_8$ | 46 660 | 1.2 |
| Example 7 | (C12/14MA-block-MMA 94-6)$_8$ | 110 300 | 1.1 |
| Example 8 | (C12/14MA-block-MMA 96-4)$_8$ | 112 800 | 1.1 |
| Comparative example 1 | C12/13/14/15MA | 16 160 | 1.3 |
| Comparative example 2 | C12/13/14/15MA | 23 450 | 1.3 |
| Comparative example 3 | C12/13/14/15/16/18MA-co-MMA 90-10 | 70 510 | 1.2 |
| Comparative example 4 | C12/13/14/15/16/18MA-co-MMA 90-10 | 80 000 | 1.5 |
| Comparative example 5 | C12/13/14/15MA-co-MMA 90-10 | 79 800 | 1.5 |
| Comparative example 6 | C12/13/14/15MA-block-DMAEMA 94-6 | 70 000 | 1.6 |
| Comparative example 7 | C12/13/14/15MA-block-DMAPMAAm 90-10 | 111 000 | 1.6 |
| Comparative example 8 | C12/13/14/15MA | 14 740 | 1.6 |
| Comparative example 9 | C12/13/14/15MA | 23 170 | 2.0 |
| Comparative example 10 | C12/13/14/15MA-co-MMA 88-12 | 22 400 | 1.9 |
| Comparative example 11 | C12/13/14/15MA-co-MMA 82-18 | 71 000 | 2.2 |

TABLE 1-continued

Polymers used

| Composition | | $M_w$ [g/mol] | PDI |
|---|---|---|---|
| Comparative example 12 | C12/13/14/15/16/18MA-co-MMA 87-13 | 375 000 | 2.7 |
| Comparative example 13 | C12/13/14/15/16/18MA-co-MMA 86-14 | 64 000 | 2.1 |

C12/14 MA, C12/13/14/15 MA, C12/13/14/15/16/18 MA stand for a methacrylate mixture which has been derived from the corresponding alcohol mixture, MMA for methyl methacrylate, DMAEMA for dimethylaminoethyl methacrylate and DMAPMAAm for dimethylaminopropyl-methacrylamide. The numerical data regarding the copolymers are based on the proportion by weight of the monomers. The indices represent the number of arms which arises from the initiators used.

C. Evaluation of the Polymers

In the case of the conventional linear PAMAs and of the narrow-distribution linear (block) PAMAs, which were present only as a solution in 100N carrier oil, the 100N carrier oil was neglected in the formulation and the formulation oil weight was added in each case.

1. Thickening Action of the Polymers in Relation to PSSI and VI.

Table 2 demonstrates that, with similar PSSI whether according to DIN 51350 (part 6, 20 h, tapered roller bearing), to ASTM D5621 (40 min, ultrasound) or to DIN 51382 (30 cycles of Bosch pump)—and with similar VI (ASTM D2270) in the case of the inventive PAMA stars compared to conventionally prepared linear PAMA ($1.6 \leq PDI \leq 2.7$) and narrow-distribution linear PAMA ($1.3 \leq PDI \leq 1.5$), the polymer concentration needed for a kinematic viscosity at 100° C. KV 100=14.0 mm$^2$/s (ASTM D445) in a 150N oil is reduced considerably.

The 150N oil had KV100=5.42 mm$^2$/s, KV40=31.68 mm$^2$/s and VI=105 as viscometric data. In each case 0.6% of Chevron-Oronite Oloa 4992 wear protection additive was added.

TABLE 2

Polymer contents for similar PSSI and VI.

| | | Polymer content [%] | PSSI | VI |
|---|---|---|---|---|
| DIN 51350, part 6 20 h, tapered roller bearing | Example 1 | 18.0 | 11 | 157 |
| | Comparative example 1 | 24.1 | 10 | 156 |
| | Comparative example 8 | 28.6 | 8 | 153 |
| | Example 2 | 16.7 | 16 | 165 |
| | Comparative example 2 | 20.6 | 17 | 163 |
| | Comparative example 10 | 22.0 | 19 | 155 |
| | Example 3 | 8.6 | 60 | 177 |
| | Comparative example 3 | 12.2 | 59 | 180 |
| ASTM D5621 40 min, ultrasound | Example 2 | 16.7 | 3 | 165 |
| | Comparative example 2 | 20.6 | 2 | 163 |
| | Comparative example 9 | 23.8 | 4 | 159 |
| | Example 4 | 7.8 | 28 | 179 |
| | Comparative example 4 | 10.2 | 27 | 185 |
| 30 cycles of Bosch pump DIN 51382 | Example 5 | 2.7 | 52 | 187 |
| | Comparative example 12 | 3.6 | 50 | 202 |

Table 3 also shows that, in the case of significantly better long-term PSSI (DIN 51350, part 6, 192 h, tapered roller bearing) and similar VI, in the case of the inventive PAMA star in example 1 compared to conventionally prepared linear PAMA in comparative example 9, the polymer concentration needed for KV100=13.15 mm$^2$/s in a VII-free, PPD and D/I package-containing API group III GO formulation is reduced considerably. It is especially remarkable that the PAMA star in example 1 also brings about similar low-temperature properties (dynamic viscosity measured with Brookfield viscometers at −40° C. BF-40 to DIN 51398, kinematic viscosity at −10° C. KV-10 to ASTM D445, pour point PP to ASTM D97) to the conventionally prepared linear PAMA in comparative example 9.

The VII-free, PPD-containing (pour point depressant) and D/I package-containing (dispersant & inhibitor) API group III GO formulation (gear oil) based on hydrocracking oil and polyalphaolefin had KV100=5.15 mm$^2$/s, KV40=25.30 mm$^2$/s and VI=137 as viscometric data with PP=−45° C.

TABLE 3

Polymer content with better long-term PSSI, comparable VI and comparable low-temperature properties.

| | Polymer content [%] | Long-term PSSI | VI | BF-40 [mPas] | KV-10 [mm$^2$/s] | PP [° C.] |
|---|---|---|---|---|---|---|
| Example 1 | 18.4 | 34 | 179 | 40250 | 1372 | −45 |
| Comparative example 9 | 22.1 | 45 | 176 | 41500 | 1448 | −45 |

2. Evaluation of the Frictional Properties

The properties of the inventive PAMA block stars as friction modifiers were also analyzed (table 4). To this end, the polymers were adjusted to KV120=9.2 mm$^2$/s with a 150N base oil (BP Enerpar 11). The formulations were subsequently subjected to friction measurements with speeds in the range from 0.005 to 2.5 m/s with the aid of a tribometer (Mini Traction Machine 3, PCS Instruments). In the course of this, the temperature was a constant 120° C. with a load of 30N (corresponds to max. Hertz contact pressure 0.93 GPa) and a slide/roll ratio of 50%. The disk consisted of type AISI 52100 steel (diameter 40.0 mm, RMS (root mean square) roughness from 25 to 30 nm, Rockwell C hardness 63, modulus of elasticity 207 GPa), as did the ball (diameter 19.0 mm, RMS roughness from 10 to 13 nm, Rockwell C hardness from 58 to 65, modulus of elasticity 207 GPa). As a result of a friction experiment, a Stribeck curve was obtained, from which the coefficients of friction f were determined at 10 mm/s.

It is found that the inventive PAMA block star in example 6 with DMAEMA blocks facing outward, in spite of a very low solids content, gives rise to a considerably better coefficient of friction f than the linear PAMA block copolymers prepared by means of ATRP in comparative example 6 and comparative example 7.

TABLE 4

Frictional properties.

| | Polymer content [%] | f |
|---|---|---|
| Example 6 | 5.6 | 0.022 |
| Comparative example 6 | 9.6 | 0.043 |
| Comparative example 7 | 6.7 | 0.026 |

3. Evaluation of the Filterability

To test the employability of the PAMA stars, for example, in particle-free hydraulic formulations, the anhydrous filterability at pressure 1 bar through 5 μm filters was analyzed to ISO 13357-2 (table 6). In this test, stage 1 specifies a projected filterability $F_1 \leq 100\%$ from early filtration data, and stage 2 a filterability $F_2 \leq 100\%$ over the entire course of the filtration.

In this test, the PAMA star in example 2 in 150N oil was compared to conventionally prepared linear comparative example 13. For example 2, surprising advantages were found with regard to the filterability, even though the polymer content in the formulation used is higher, such that the flowabilities in KV40 and KV100 are lower.

TABLE 6

Filterability.

| | Polymer content [%] | KV40 [mm²/s] | KV100 [mm²/s] | $F_1$ [%] | $F_2$ [%] |
|---|---|---|---|---|---|
| Example 2 | 15.0 | 78.0 | 12.6 | 97 | 90 |
| Comparative example 13 | 5.0 | 45.4 | 8.1 | 88 | 66 |

4. Evaluation of the Oxidation Stability

To test the oxidation stability (table 7), oxidation tests to CEC L-48-A-00 (B) (160° C., 192 h, air flow 5 l/h) were performed with a solution of 5.3% polymer in a VII-free, PPD and D/I package-containing API group I GO formulation, and the relative change $\Delta KV100_{rel}$ was determined. In addition, on completion of oxidation, the n-hexane-insoluble constituents $I_s$ (insolubles) from the suspension were determined gravimetrically. A comparison with conventionally prepared linear PAMA (comparative example 11) showed surprising advantages for the PAMA star in example 2.

The API group I GO formulation mentioned was based on paraffinic mineral oil and had KV40=21.96 mm²/s, KV100=4.33 mm²/s and VI=107 as viscometric data.

TABLE 7

Oxidation stability.

| | KV100 [mm²/s] | $\Delta KV100_{rel}$ [%] | $I_s$ [%] |
|---|---|---|---|
| Example 2 | 5.9 | 10.4 | 0.62 |
| Comparative example 11 | 7.3 | 19.2 | 0.92 |

D) Application as a Gelling Agent

Table 8 demonstrates again that, for polymer samples of similar PSSI—whether according to DIN 51350 (part 6, 20 h, tapered roller bearing) or to ASTM D5621 (40 min, ultrasound)—for example in the case of the inventive PAMA block stars in example 8 and example 9 compared to linear PAMA prepared via ATRP in comparative example 3 and comparative example 5, the polymer concentration needed for KV100=14.0 mm²/s in a 150N oil is reduced considerably. It is additionally especially remarkable that the block like structure of the PAMA block stars with MMA blocks facing outward ensures that the viscosity, via reversible associative thickening, can rise to an exceptionally high level at reduced temperature (40° C.) (table 8). This is reflected in controlled low VI in the case of example 7 and example 8 compared to comparative example 3 and comparative example 5. However, shear destroys the associative effect at 40° C. again, recognizable by the observation that $PSSI_{40° C.} > PSSI_{100° C.} = PSSI$. Typically, for linear PAMAs, however, $PSSI_{40° C.} = PSSI_{100° C.}$ to $PSSI_{40° C.} \leq PSSI_{100° C.}$ The 150N oil had KV100=5.42 mm²/s, KV40=31.68 mm²/s and VI=105 as viscometric data. In each case 0.6% Chevron-Oronite Oloa 4992 wear protection additive was added.

TABLE 8

Properties as an associative thickener.

| | | Polymer content [%] | PSSI | VI | $PSSI_{40° C.}$ |
|---|---|---|---|---|---|
| DIN 51350, part 6 20 h, tapered roller bearing | Example 7 | 6.4 | 70 | 27 | 91 |
| | Example 8 | 9.0 | 67 | 110 | 79 |
| | Comparative example 3 | 12.2 | 59 | 180 | 58 |
| ASTM D5621 40 min, ultrasound | Example 7 | 6.4 | 26 | 27 | 60 |
| | Example 8 | 9.0 | 23 | 110 | 28 |
| | Comparative example 5 | 10.2 | 26 | 185 | 25 |

The invention claimed is:
1. A polymer, comprising:
50-100% by weight, based on the weight of the polymer, of repeat units which are derived from one or more ethylenically unsaturated ester compounds of the formula (I)

(I)

in which R is hydrogen or methyl, $R^1$ is a linear or branched alkyl radical having from 7 to 30 carbon atoms, $R^2$ and $R^3$ are each independently hydrogen or a group of the formula —COOR' in which R' is hydrogen or an alkyl group having from 7 to 30 carbon atoms,
wherein the polymer is a star polymer having from 3 to 21 arms and at least 3 of the arms comprise at least 40% by weight, based on the weight of the arms, of repeat units which derive from one or more ethylenically unsaturated ester compounds of the formula (I)

(I)

in which R is hydrogen or methyl, $R^1$ is a linear or branched alkyl radical having from 7 to 30 carbon atoms, $R^2$ and $R^3$ are each independently hydrogen or a group of the formula —COOR' in which R' is hydrogen or an alkyl group having from 7 to 30 carbon atoms;
wherein the polymer is prepared by controlled polymerization proceeding from a polyfunctional initiator;
wherein the number of polymer arms depends on the number of functionalities of the initiator;
wherein the center of the star polymer has at most 50 carbon atoms;
wherein the star polymer has a polydispersity $M_w/M_n$ in the range from 1.0 to 2.0; and wherein the polymer has from 0.1 to 40% by weight of repeat units which are derived from one or more ethylenically unsaturated ester compounds of the formula (II)

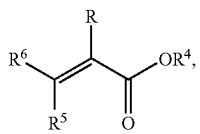
(II)

in which R is hydrogen or methyl, $R^4$ is a linear or branched alkyl radical having from 1 to 6 carbon atoms, $R^5$ and $R^6$ are each independently hydrogen or a group of the formula —COOR" in which R" is hydrogen or an alkyl group having from 1 to 6 carbon atoms.

2. The polymer as claimed in claim 1, wherein the polymer has a filterability of at least 90%, based on a projected filterability (stage 1) to ISO 13357-2.

3. The polymer as claimed in claim 1, wherein the polymer has a filterability of at least 70%, based on the overall course of the filtration (stage 2) to ISO 13357-2.

4. The polymer as claimed in claim 1, wherein the star polymer has from 5 to 12 arms.

5. The polymer as claimed in claim 1, wherein the star polymer has a weight-average molecular weight $M_w$ in the range from 25 000 to 150 000 g/mol.

6. The polymer as claimed in claim 1, wherein the star polymer has a polydispersity $M_w/M_n$ in the range from 1.0 to 1.3.

7. The polymer as claimed in claim 1, wherein the polymer has up to 30% by weight of repeat units which are derived from dispersing monomers (III).

8. The polymer as claimed in claim 7, wherein the dispersing monomer is a dispersing (meth)acrylate based on an alcohol $R^7$—OH or a (meth)acrylamide based on an amine $R^7$—$NR^8$—H, in that $R^7$ is independently a group which comprises from 2 to 200 carbon atoms and has at least one heteroatom and in that $R^8$ is independently hydrogen or a group having from 1 to 20 carbon atoms.

9. The polymer as claimed in claim 8, wherein the $R^7$ radical comprises at least one group of the formula —$OR^8$ or —$NR^8R^8$, in which the $R^8$ radicals are each independently hydrogen or a group having from 1 to 20 carbon atoms.

10. The polymer as claimed in claim 8, wherein the $R^7$ radical comprises at most 10 carbon atoms.

11. The polymer as claimed in claim 1, wherein the star polymer has at least two blocks.

12. The polymer as claimed in claim 11, wherein the star polymer has at least one lipophilic and one lipophobic block.

13. The polymer as claimed in claim 12, wherein at least one lipophobic block has at least 50% by weight, based on the weight of the block, of repeat units which are derived from one or more ethylenically unsaturated ester compounds of the formula (II), dispersing oxygen and/or nitrogen-functionalized monomers (III) and/or further ethylenically unsaturated comonomers (IV).

14. The polymer as claimed in claim 12, wherein the polymer, within a lipophobic block, displays lipophobic segments having an integer segment length greater than or equal to 3.

15. The polymer as claimed in claim 12, wherein the lipophobic block is arranged in the first half of the corresponding arm, the center constituting the start, of a viscosity index-increasing star polymer.

16. The polymer as claimed in claim 12, wherein the lipophobic block is arranged in the second half of the corresponding arm, the center constituting the start, of a viscosity index-increasing star polymer.

17. The polymer as claimed in claim 15, wherein the polymer is arranged in the first half of the corresponding arm, the center constituting the start, of a lipophobic block comprising at least 50% by weight, based on the weight of the block, of repeat units which are derived from one or more ethylenically unsaturated ester compounds of the formula (II) and/or further comonomers (IV), and a lipophobic block which is derived from dispersing oxygen- and/or nitrogen-functionalized monomers (III) in the second half of the corresponding arm, the center constituting the start.

18. The process for preparing polymers as claimed in claim 1, wherein polymer is prepared by controlled free-radical polymerization proceeding from a polyfunctional initiator.

19. The process as claimed in claim 1, wherein the polymerization is performed in the presence of an oil and/or nonpolar solvent.

20. An oil formulation comprising star polymers as claimed in claim 1.

21. The oil formulation as claimed in claim 20, wherein the oil formulation comprises from 1 to 25% by weight of star polymers.

22. The oil formulation as claimed in claim 20, wherein the PSSI to ASTM D5621 (ultrasound for 40 min) is less than or equal to 25.

23. The oil formulation as claimed in claim 20, wherein the PSSI to DIN 51350 part 6 (20 h, tapered roller bearing) is less than or equal to 50.

24. The oil formulation as claimed in claim 20, wherein the viscosity index can be adjusted in a controlled manner within the range from 0 to 300.

25. The oil formulation as claimed in claim 20, wherein the oil formulation is a lubricant oil formulation.

26. The lubricant oil formulation as claimed in claim 25, which comprises base oils of API group I, II, III, IV and/or group V.

27. The lubricant oil formulation as claimed in claim 26, wherein the lubricant oil formulation comprises at least one additional additive which is not a star polymer.

28. The lubricant oil formulation as claimed in claim 27, wherein the additional additive is a viscosity index improver, pour point improver, dispersant and/or friction modifier.

29. The lubricant oil formulation as claimed in claim 27, wherein the additive is based on a linear polyalkyl (meth) acrylate having from 1 to 30 carbon atoms in the alcohol group.

30. A viscosity modifier, pour point improver, dispersant and/or friction modifier comprising a star polymer as claimed in claim 1.

31. A polymer, comprising:
50-100% by weight, based on the weight of the polymer, of repeat units which are derived from one or more ethylenically unsaturated ester compounds of the formula (I)

(I)

in which R is hydrogen or methyl, $R^1$ is a linear or branched alkyl radical having from 7 to 30 carbon atoms, $R^2$ and R³ are each independently hydrogen or a group of the formula —COOR' in which R' is hydrogen or an alkyl group having from 7 to 30 carbon atoms, wherein the polymer is a star polymer having from 3 to 21 arms and at least 3 of the arms comprise at least 40% by weight, based on the weight of the arms, of repeat units which derive from one or more ethylenically unsaturated ester compounds of the formula (I)

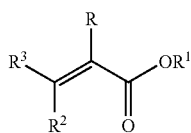

(I)

in which R is hydrogen or methyl, $R^1$ is a linear or branched alkyl radical having from 7 to 30 carbon atoms, $R^2$ and $R^3$ are each independently hydrogen or a group of the formula —COOR' in which R' is hydrogen or an alkyl group having from 7 to 30 carbon atoms;

wherein the star polymer has a filterability of at least 90%, based on a projected filterability (stage 1) to ISO 13357-2;

wherein the star polymer has a filterability of at least 70%, based on the overall course of the filtration (stage 2) to ISO 13357-2;

wherein the star polymer has a weight-average molecular weight $M_w$ in the range from 25 000 to 150 000 g/mol;

wherein the star polymer has a polydispersity $M_w/M_n$ in the range from 1.0 to 1.3; and wherein the polymer has from 0.1 to 40% by weight of repeat units which are derived from one or more ethylenically unsaturated ester compounds of the formula (II)

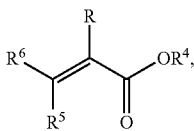

(II)

in which R is hydrogen or methyl, $R^4$ is a linear or branched alkyl radical having from 1 to 6 carbon atoms, $R^5$ and $R^6$ are each independently hydrogen or a group of the formula —COOR" in which R" is hydrogen or an alkyl group having from 1 to 6 carbon atoms.

\* \* \* \* \*